United States Patent
Liu et al.

(10) Patent No.: US 12,155,661 B2
(45) Date of Patent: Nov. 26, 2024

(54) SERVICE DEPLOYMENT METHOD, DEVICE, SYSTEM, AND COMPUTER-READABLE STORAGE MEDIUM

(71) Applicant: BOE Technology Group Co., Ltd., Beijing (CN)

(72) Inventors: Wei Liu, Beijing (CN); Zhenjun Shao, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 375 days.

(21) Appl. No.: 17/487,079

(22) Filed: Sep. 28, 2021

(65) Prior Publication Data
US 2022/0103555 A1 Mar. 31, 2022

(30) Foreign Application Priority Data
Sep. 28, 2020 (CN) .......................... 202011044431.X (51) Int. Cl.
*H04L 9/40* (2022.01)
*G06F 8/61* (2018.01)

(52) U.S. Cl.
CPC ................ *H04L 63/10* (2013.01); *G06F 8/61* (2013.01)

(58) Field of Classification Search
CPC ....... H04L 63/10; H04L 63/107; H04L 63/18; H04L 63/20; G06F 8/61; G06F 8/60; G06F 21/105; G06F 21/10; G06F 21/1084; G06F 21/44; G06F 21/12; G06F 21/30

See application file for complete search history.

(56) References Cited

U.S. PATENT DOCUMENTS

| | | | |
|---|---|---|---|
| 9,928,059 B1* | 3/2018 | Sartor | G06F 8/71 |
| 2011/0065415 A1 | 3/2011 | Miller et al. | |
| 2015/0288651 A1* | 10/2015 | Hu | H04L 61/5007 709/226 |
| 2018/0367363 A1* | 12/2018 | Jaeger | H04L 41/02 |
| 2019/0171367 A1* | 6/2019 | He | G06F 3/0619 |
| 2021/0149648 A1* | 5/2021 | Velammal | G06N 20/00 |

(Continued)

FOREIGN PATENT DOCUMENTS

| | | |
|---|---|---|
| CN | 106487935 A | 3/2017 |
| CN | 107257344 A | 10/2017 |

(Continued)

OTHER PUBLICATIONS

CN202011044431.X first office action dated Apr. 29, 2024.
CN202011044431.X second office action dated Jun. 19, 2204.

*Primary Examiner* — Shaqueal D Wade-Wright
(74) *Attorney, Agent, or Firm* — IPro, PLLC (57) ABSTRACT

Provided is a service deployment method, including: acquiring an installation file of a service to be deployed from a service operation system; accessing a first internal network of a service deployment demander; communicating with a service server operating in a second internal network of the service deployment demander via the first internal network through an authorization protocol from the service deployment demander, wherein the first internal network is in communication with the second internal network, and the second internal network allows to be accessed through the authorization protocol; and completing a service deployment in the service server by using the installation file.

17 Claims, 3 Drawing Sheets

(56) References Cited

U.S. PATENT DOCUMENTS

| | | | | |
|---|---|---|---|---|
| 2021/0385288 A1* | 12/2021 | Shen | ............... | H04L 67/51 |
| 2022/0021652 A1* | 1/2022 | Moghe | ............... | H04L 63/20 |
| 2023/0088364 A1* | 3/2023 | Griffin | ............... | G06F 9/461 |
| | | | | 718/104 |

FOREIGN PATENT DOCUMENTS

| | | | |
|---|---|---|---|
| CN | 107483243 A | 12/2017 | |
| CN | 108897559 A | 11/2018 | |
| CN | 109639652 A | 4/2019 | |
| CN | 109981367 A | 7/2019 | |
| CN | 111538545 A | 8/2020 | |

* cited by examiner

Resource Acquisition>>Front-End

Resource Acquisition | Front-End | Back-End | Database | Queue Service | Self-Define |

Deployment Upgrade web

Testing    Fill Out Project Name        Acquire     Settings Common Tools    Compilation Settings        Fold      Fill Out Jenkins Project Url Help      token        Save      *Docker-Compose* Template      Upload *Docker-Compose* File    Upload   Compile

Image

Enter Image Name

Image Tag

Add Front-End Project

SERVICE DEPLOYMENT METHOD, DEVICE, SYSTEM, AND COMPUTER-READABLE STORAGE MEDIUM

CROSS-REFERENCE TO RELATED APPLICATION

This application is based on and claims priority to Chinese Patent Application No. 202011044431.X, filed on Sep. 28, 2020 and entitled "SERVICE DEPLOYMENT METHOD AND RELATED DEVICES", the disclosure of which is herein incorporated by reference in its entirety.

TECHNICAL FIELD

The present disclosure relates to the field of computer technologies, and more particularly to a service deployment method, device, system, and computer readable storage medium.

BACKGROUND

A privatized deployment is generally understood as a local deployment inside an enterprise. The objects for performing the privatized deployment generally include enterprise management tools, enterprise communication tools, enterprise development tools, and so on.

SUMMARY

The embodiments of the present disclosure provide a service deployment method, device, system, and computer readable storage medium.

In a first aspect, the embodiments of the present disclosure provide a service deployment method, including:
  acquiring an installation file of a service to be deployed from a service operation system;
  accessing a first internal network of a service deployment demander;
  communicating with a service server operating in a second internal network of the service deployment demander via the first internal network through an authorization protocol from the service deployment demander, wherein the first internal network is in communication with the second internal network, and the second internal network allows to be accessed through the authorization protocol; and
  completing a service deployment in the service server by using the installation file.

Optionally, the communicating with a service server operating in a second internal network of the service deployment demander via the first internal network through an authorization protocol from the service deployment demander, includes:
  communicating, by a batch management tool, with the service server via the first internal network through the authorization protocol.

Optionally, the authorization protocol is a zmq protocol, wherein the zmq protocol is a protocol in an intra-process communication.

Optionally, the acquiring an installation file of a service to be deployed from a service operation system includes:
acquiring an image file of the service to be deployed, and wherein the completing a service deployment in the service server by using the installation file includes: completing the service deployment in the service server by using the image file by means of a container technology.

Optionally, the method further includes:
  acquiring a management file of a container corresponding to the image file from the service operation system; and
  completing a management deployment of the service in the service server by using the management file.

Optionally, the method further includes:
  performing a code scan detection on the installation file by using the service operation system to determine an availability of the installation file.

Optionally, the method further includes:
  calling a service interface of the service server to test the deployed service.

Optionally, the method further includes:
  in response to determining that it is not enabled to utilize the authorization protocol from the service deployment demander to communicate with the service server via the first internal network, switching a deployment mode to a protocol other than the authorization protocol to communicate with the service server via the first internal network.

In a second aspect, the embodiments of the present disclosure provide an electronic device, including:
  a communication interface, configured to connect to a service operation system or a first internal network of a service deployment demander;
  a memory, configured to store a set of instructions; and
  at least one processor, configured to execute the set of instructions to implement the method in the first aspect.

In a third aspect, the embodiments of the present disclosure provide a service deployment system, including: the electronic device in the second aspect and a service operation system, wherein the service operation system is configured to: establish a connection with the electronic device and send the installation file of the service to be deployed to the electronic device.

In a fourth aspect, the embodiments of the present disclosure provide a non-transitory computer-readable storage medium storing computer instructions thereon for causing a processor of a computer to perform the method in the first aspect.

BRIEF DESCRIPTION OF THE DRAWINGS

In order to more clearly illustrate the technical solutions of the present disclosure, the following will briefly introduce the drawings that need to be used in the description of the embodiments of the present disclosure. Clearly, the following drawings are only used for describing the embodiments of the present disclosure, and those of ordinary skills in the art may derive other drawings without creative effort based on these drawings.

DETAILED DESCRIPTION

For a clearer understanding of the objects, technical solutions, and advantages of the present disclosure, reference is made to the following detailed description, in conjunction with the accompanying drawings, which form a further detailed description of the disclosure.

It is to be noted that, unless otherwise defined, technical and scientific terms used herein should be given the ordinary meaning as understood by those with ordinary skills in the art to which this disclosure belongs. The use of "first", "second", and similar words in the present disclosure does not denote any order, quantity, or importance, but rather is used to distinguish one component from another. The use of the word "include, includes, including" or "comprise, comprises, comprising" and the like means that the element or object appearing in front of the word encompasses the element or object appearing behind the word and equivalents thereof, but does not preclude other elements or objects. Terms like "connected" or "connecting", and the like, are not intended to be limited to physical or mechanical connections, but may include electrical connections, whether direct or indirect.

DevOps (Development & Operations) is a term derived from the combination of Development and Operations. The DevOps system (also referred to as DevOps management platform) is an automated development operation system that breaks the barriers among the development, operations, and testing. Its main workflow is that: the developer submits and merges code into the required branch to trigger the workflow. After a code compilation is completed, the code is scanned with a code analysis tool (such as a sonarqueb). Then, when the code scanning finishes, the code is packaged, and an image file is made and uploaded to the image repository of DevOps. The image file is then published by the publishing system of the DevOps to the customer's service server (the server to which the service is deployed) and then is monitored and alerted by the DevOps system. The full workflow generally does not require manual operations, and can be done automatically after a triggering condition is reached.

With the advent of DevOps, the development and operation work is made easier and more efficient. However, these concepts and related solutions are generally presented based on a development-test-production platform on a relatively large scale. When providing a privatized deployment to a customer, the intranet server of the customer's enterprise may not be able to access the DevOps system due to security concerns, thus the privatized deployment is still staying at the stage of a script or program deployment. In addition, because the internal networks within different companies are isolated from each other, the DevOps system still cannot run across the mutually isolated internal networks of each enterprise.

Furthermore, some solutions of the privatized deployment may have some drawbacks: 1) the offline installation requires downloading of files to a customer's server (e.g., any server of the customer), which is detrimental to the privacy of the installation files; 2) the communication between service servers (e.g., the customer's servers that need to be performed with the privatized deployment) requires a secure shell (ssh) protocol, while the ssh protocol is disabled by many enterprise intranet servers, which makes the communication process obstructed; 3) the installation process does not provide a graphical display and the configuration files are complex, requiring specialized development and operation personnel to operate.

Embodiments of the present disclosure propose a service deployment method, including: acquiring an installation file of a service to be deployed from a service operation system; accessing a first internal network of a service deployment demander; communicating with a service server operating in a second internal network of the service deployment demander via the first internal network through an authorization protocol from the service deployment demander, wherein the second internal network is a service server intranet of the service deployment demander, the first internal network is in communication with the second internal network, and the second internal network is permitted to be accessed through the authorization protocol; and completing a service deployment in the service server by using the installation file. As such, embodiments of the present disclosure provide a privatized deployment approach that can use an electronic device to link up the upstream and downstream of the whole workflow of the service deployment (i.e., the service operation system and the service server) across physically isolated networks.

Figure 1:
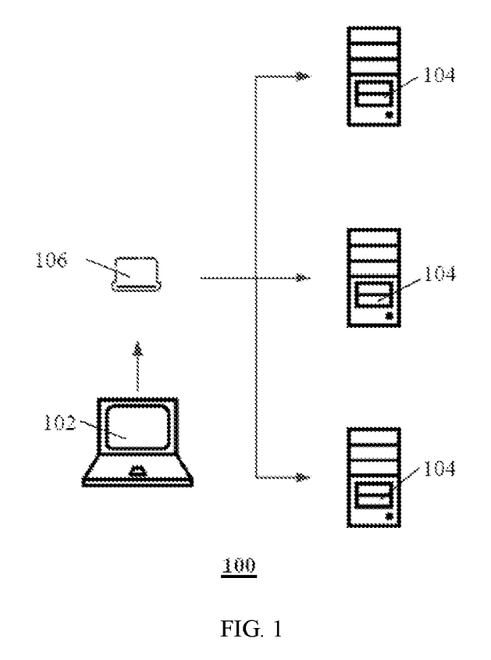
FIG. 1 illustrates a schematic structural diagram of an exemplary service deployment system provided by an embodiment of the present disclosure.

FIG. 1 illustrates a schematic structural diagram of an exemplary service deployment system provided by an embodiment of the present disclosure.

The service deployment system 100 includes an upstream service operation system 102, a downstream server 104 of the service deployment demander, and an electronic device 106 that connects, communicates, or links up the service operation system 102 and the server 104 of the service deployment demander.

The service operation system 102 may be implemented as a DevOps system, which can provide files such as installation files, configuration files, and upgrade files of a service to be deployed. The electronic device 106 may acquire a relevant file from the service operation system 102 according to the content of the service to be deployed, e.g., an installation file to be deployed. In some embodiments, the installation file may be implemented as an image file, which can be used in employing a container technology (e.g., Docker) to deploy the service.

The electronic device 106 can link up the upstream and downstream of the service deployment and thus may also be referred to as a "ferry terminal". The electronic device 106 may be implemented as a portable hardware device, such as a hardware device with a shape and size similar to a mobile hard disk. The electronic device 106 may access the service operation system 102 by connecting to a vendor's device that provides the service deployment functionality, e.g., by connecting to a vendor's office computer to access the service operation system 102. The connection of the vendor's office computer to the service operation system 102 may be implemented via the vendor's internal local area network, or via the internet, and the specific implementation is not limited in this context, as the case may be. In some embodiments, the electronic device 106 may also be implemented as a portable hardware device which has the function of a computer, e.g., a laptop computer, a tablet computer, or the like. In some embodiments, the electronic device 106 may also be implemented as a hardware device that is smaller in volume, such as a hardware device that has a shape and size close to a USB flash disk.

After the electronic device 106 accesses the service operation system 102, the electronic device 106 may retrieve an installation file of the service to be deployed from the service operation system 102 and conduct the service deployment by using the installation file after accessing to the internal network of the service deployment demander.

The electronic device 106, after being moved to the location of the service deployment demander, may access a first internal network of the service deployment demander. In some embodiments, the first internal network may be an intranet, having a relatively low authority, of the service deployment demander, such as an office network of the service deployment demander. The electronic device 106 may access the first internal network by accessing the office network of the service deployment demander, typically without needing to apply for an additional authorization.

After the electronic device 106 accesses the first internal network, the electronic device 106 may communicate, through an authorization protocol from the service deployment demander, with a service server operating in a second internal network of the service deployment demander via the first internal network. In some embodiments, the second internal network is a service server intranet of the service deployment demander, the first internal network and the second internal network are in communication with each other, and the service server is a target server of the service deployment, which may be one or more of the servers 104 of the service deployment demander. When the service server is an intranet server of the service deployment demander, it may be working in a network with a relatively narrow authority range, so some protocols may be disabled. Therefore, it may requires the authorization protocol from the service deployment demander (or the authorization protocol of the intranet server protocol) before the second internal network allows it to perform the communication. In some embodiments, the authorization protocol may be a zmq protocol that is much less likely to be disabled by the intranet servers of enterprises compared to the ssh protocol. Therefore, when the zmq protocol is used, the connected first internal network and second internal network can be configured to realize the communication between the electronic device 106 and the enterprise's intranet server, and it is not easy to meet the circumstance where the protocol is disabled. The zmq protocol is a protocol in an intra-process communication.

After the electronic device 106 implements the communication with the service server via the first internal network and the second internal network, the service deployment may be completed in the service server of the service deployment demander by using the installation file of the service to be deployed.

In some embodiments, the installation file may be an image file, and completing the service deployment in the service server of the service deployment demander by using an installation file of the service to be deployed includes: completing the service deployment in the service server of the service deployment demander by using the image file of the service to be deployed by means of a container technology (e.g., Docker). In this way, by employing the Docker, such containerization has less dependence on the service server, and the installation thereof is more convenient and reliable.

In some embodiments, the electronic device 106 may also acquire a management file (e.g., a Docker-compose management tool) of the container corresponding to the image file of the service to be deployed from the service operation system 102. In addition, the electronic device 106 may utilize the management file of the image file of the service to be deployed to complete the management deployment of the service in the service server of the service deployment demander. In this way, by using Docker-compose to provide container compilation and lifecycle management, less resources are taken up than container management platforms such as k8s and k3s, which is more suitable for small-scale privatized installations, and is easier to manage.

The service to be deployed in this embodiment may be any service, for example, a meeting signage service, intelligent meeting management service, smart handle development environment service, intelligent meeting management system service, meeting signage item production environment service, and general purpose information distribution production environment service, etc.

Figure 2:
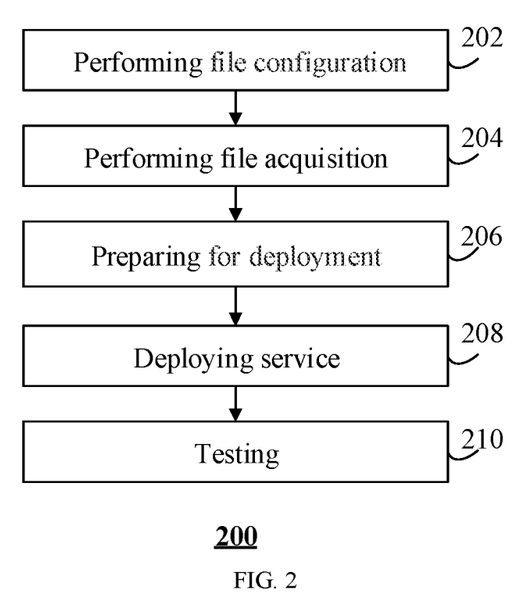
FIG. 2 illustrates a flowchart showing an exemplary service deployment method provided by an embodiment of the present disclosure.

The following takes an information publishing system as an example to exemplarily introduce the working process 200 of deploying a service by the electronic device 106, as shown in FIG. 2.

Figure 3:
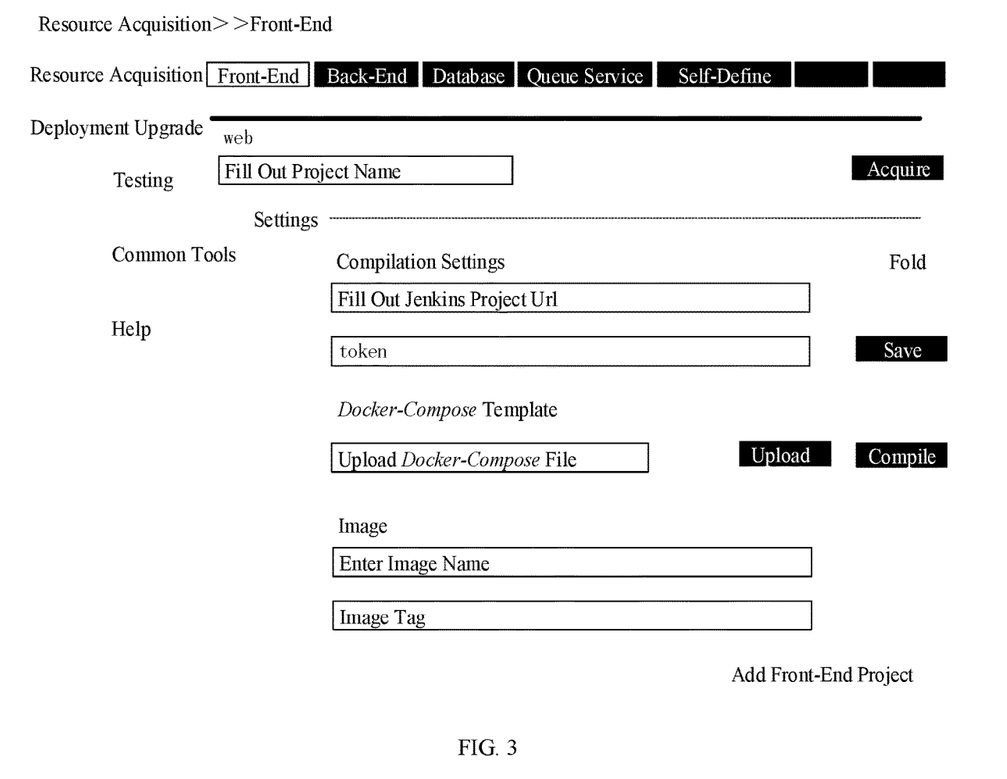
FIG. 3 illustrates a schematic diagram of an exemplary operation interface provided by an embodiment of the present disclosure.

The electronic device 106 may utilize a vendor's office computer to access the service operation system 102, and the interface shown in FIG. 3 is shown after the service operation system 102 is accessed.

In step 202, a file configuration may be performed first.

As shown in FIG. 3, the Front-end is selected in the interface and the Settings are opened to complete the following operations:

filling out the project name of the service to be deployed in the project name field;

filling out the URL address of the Jenkins project and the corresponding token for the service to be deployed in the compilation settings field, so as to retrieve the installation file or image file of the service to be deployed from the service operation system 102;

uploading a Docker-compose file, wherein the function of the Docker-compose file may include: container compilation (e.g., deciding which image file is configured to start the container, port mapping of the container, persistent storage, and in-container variables, etc.) and container lifecycle management (e.g., deciding when will the container be restarted); the function of the Docker-compose file may vary in each item, and the different versions of Docker-compose files of a same project may also be updated, therefore, the location for uploading the Docker-compose file can be reserved; and in some embodiments, if the existing Docker-compose file in the electronic device 106 satisfies the deployment requirement, there is no need to upload the Docker-compose file into the electronic device 106; and filling out the image name of the installation file and its tag.

Then, the Back-end is selected in the interface and the Settings are opened to complete the operations similar to the front-end.

Next, the Database may be selected in the interface and the settings are opened to complete the following respective operations:

selecting the database type as mysql and select an image version of the database, wherein the database architecture type is selected as a master-slave architecture, that is, there is one master server and at least one slave server in the servers to which the service is to be deployed;

filling out the base library and corresponding user name and password; and uploading the sql scripts to the database, wherein the sql scripts are configured to initialize the database. For instance, the start of some projects needs the writing of some relevant data in the database in advance for service use, in which case the corresponding sql scripts need to be uploaded for initializing the database. It is to be noted that, in some cases, the developer does not necessarily place the sql scripts for initializing the database in the code to which the service is to be deployed. Therefore, in order to improve the availability of the electronic device, the location for uploading the sql scripts may be reserved; and in some embodiments, if the code to which the service is to be deployed already has the sql scripts for initializing the database per se, there is no need to upload the sql scripts for initializing the database.

In step 204, the acquisition of an installation file is performed.

When the electronic device 106 is within the vendor's internal network, by selecting the Front-end and the Back-end in the interface and clicking the acquire button, the latest image files of services corresponding to the front-end and back-end can be respectively obtained. In some embodiments, the latest code files of the corresponding services are first acquired from the database of the service operation system 102, and then the code files are compiled and a scan detection is performed on the code files by using the sonarqube tool provided by the service operation system 102. After the scan detection is passed, the product is packaged or saved, and is further made as an image file, which is in turn acquired and saved by the electronic device 106. In some embodiments, the image file may also be uploaded to an image repository for subsequent use. In some embodiments, if the image file already exists, it can be acquired directly without the aforementioned steps of code compilation, scanning or the like.

The database image file may be built into the electronic device 106, as the database version would generally not change frequently, and there is no need to acquire it every time a preparation for the deployment is made.

In step 206, a preparation for the service deployment is performed.

1) The electronic device 106 is made to access the first internal network of the service deployment demander (e.g., the customer's office network).

2) A customized saltstack client script is run on the customer's server 104, so as to register the customer's server 104 to the electronic device 106. The customized saltstack client script is a very small client installation file. When it is copied to the service server (i.e., the customer's server 104 that needs to be deployed the service) and a run command is executed, it will prompt to input the name of the service server, and the server address of the service server. The saltstack client script will be actively linked to the electronic device 106 after it is completely run, and the corresponding operations will be completed on the service server according to the instructions from the electronic device 106, the operations for example including: 1) receiving the file sent by the electronic device 106 and copying it to corresponding position of the service server; 2) starting the container, or stopping the container; and 3) uploading server information, container status, etc. to the electronic device 106.

In step 208, a service deployment is performed.

The IP address of the electronic device 106 in the first internal network is entered in the browser to enter the installation interface. The installation interface includes a Database tab, a Back-end tab, and a Front-end tab.

Figure 4:
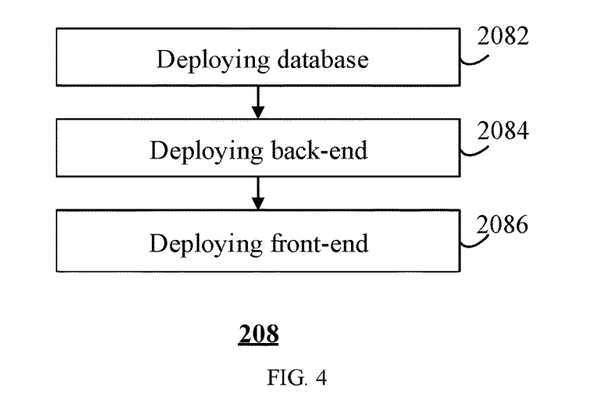
FIG. 4 illustrates a flowchart showing an exemplary process of conducting a service deployment provided by an embodiment of the present disclosure.

Referring to FIG. 4, in step 2082, the deployment of a database service is performed.

By clicking the Database tab, the database architecture can be chosen as one master and one slave architecture. In the pull-down menu, corresponding servers 104 are respectively selected as the master server and the slave server(s) from the servers 104 of the service deployment demander.

In some embodiments, various database architectures are preset in the electronic device 106 for selection. The electronic device 106 acquires the information of the servers 104 of the service deployment demander, and writes it in the pull-down menu of the interface for selection.

Further, the installation path of the database is filled out.

In some embodiments, if the installation path of the database is not filled out, the database will be installed in the /data directory by default; and when it is detected that there is no /data directory, the database can be installed in the /usr/local/ directory.

By clicking the install button, the deployment of the database service can be started.

The deployment result will be displayed after the database deployment is completed and is detected as successful by the system.

In step 2084, the deployment of a back-end service is performed.

By clicking the Back-end tab and selecting a high-availability architecture, two servers can be selected from the servers 104 of the service deployment demander for deploying the back-end services. The high-availability architecture is an architecture compared to single-point server architecture, that is, each service will be deployed to multiple servers. It is an option for the server architecture in the menu, and a high availability or single-point deployment manner can be selected.

Then, the installation path of the back-end service is filled out.

In some embodiments, if the installation path of the back-end service is not filled out, the back-end service will be installed in the /data directory by default; and when it is detected that there is no /data directory, the back-end service can be installed in the /usr/local/ directory.

By clicking the install button, the deployment of the back-end service can be started. For example, the image file of the back-end service may be sent to the selected service server for installation.

The deployment result will be displayed after the back-end deployment is completed and is detected as successful by the system.

In step 2086, the deployment of the front-end service is performed.

By clicking the Front-end tab and selecting a high-availability architecture, two servers can be selected from the servers 104 of the service deployment demander for deploying the front-end services. The high-availability architecture is an architecture compared to single-point server architecture, that is, each service will be deployed to multiple servers. It is an option for the server architecture in the menu, and a high availability or single-point deployment manner can be selected.

Then, the installation path of the front-end service is filled out.

In some embodiments, if the installation path of the front-end service is not filled out, the front-end service will be installed in the /data directory by default; and when it is detected that there is no /data directory, the front-end service can be installed in the /usr/local/ directory.

By clicking the install button, the deployment of the front-end service can be started. For example, the image file of the front-end service may be sent to the selected service server for installation.

In some embodiments, the high-availability architecture will install both the keepalive and the nginx services. In the high-availability architecture, the nginx+keepalive services will combine multiple service nodes into a cluster to ensure that each service node can be reasonably allocated to the tasks (load balancing), and when any of the nodes is down, the service can still run normally (the node which is down will be discovered by the health check of an nginx master node and removed from the cluster, and will be added back to the cluster until the nginx determines that the node is normal. If the nginx master node goes down, keepalive will assign another nginx as the master node).

The deployment result will be displayed after the front-end deployment is completed and is detected as successful by the system.

In step 210, the deployed service is tested.

The installation interface also includes a test button. By clicking the test button, the test script can be called to obtain a test result.

When the test is passed, the service deployment is completed.

After the service deployment is completed, if a related service needs to be updated, different updating approaches can be employed according to different circumstances.

To perform a regular update for the front-end service or the back-end service, the electronic device 106 may be utilized to access the service operation system 102 and acquire the latest image file of the front-end service or the back-end service.

To update the database, the latest sql file needs to be uploaded to the electronic device 106, and when the electronic device 106 is configured to deploy a service in the service server of the service deployment demander, the database update will be automatically performed.

If the version of the front-end service or back-end service changes greatly, it requires to rewrite the tag of the image file in the settings of the services in the interface (referring to FIG. 3) displayed by the electronic device 106.

If the configuration of the front-end service or the back-end service is changed, generally, it is necessary to re-upload the Docker-compose file.

After the update of the electronic device 106 is completed, the electronic device 106 is moved into the first internal network, so as to update the services in the service server.

As can be seen from the above embodiments, the embodiments of the present disclosure provide a privatized deployment method that can use an electronic device to link up the upstream and downstream of the workflow of the service deployment across physically isolated networks. In some embodiments, the embodiments of the present disclosure are based on the DevOps workflow, utilizing a lightweight and mobile node, the "ferry terminal" (the electronic device 106), to break the physical isolation between networks to complete the entire workflow of the privatization deployment. The ferry terminal will "dock" in the existing DevOps system to automatically complete processes like code update, compilation and scanning. As for the privatization deployment/detection part of the service, the ferry terminal will "ferry" to the customer enterprise's network which is physically isolated from other networks, and complete the privatization deployment by constructing a lightweight downstream part of the workflow. In this case, the ferry terminal does not need to be connected to the internal network of the service server (the server to be deployed the service), and it is not necessary to copy all files to the service server, which improves the security performance.

Figure 5:
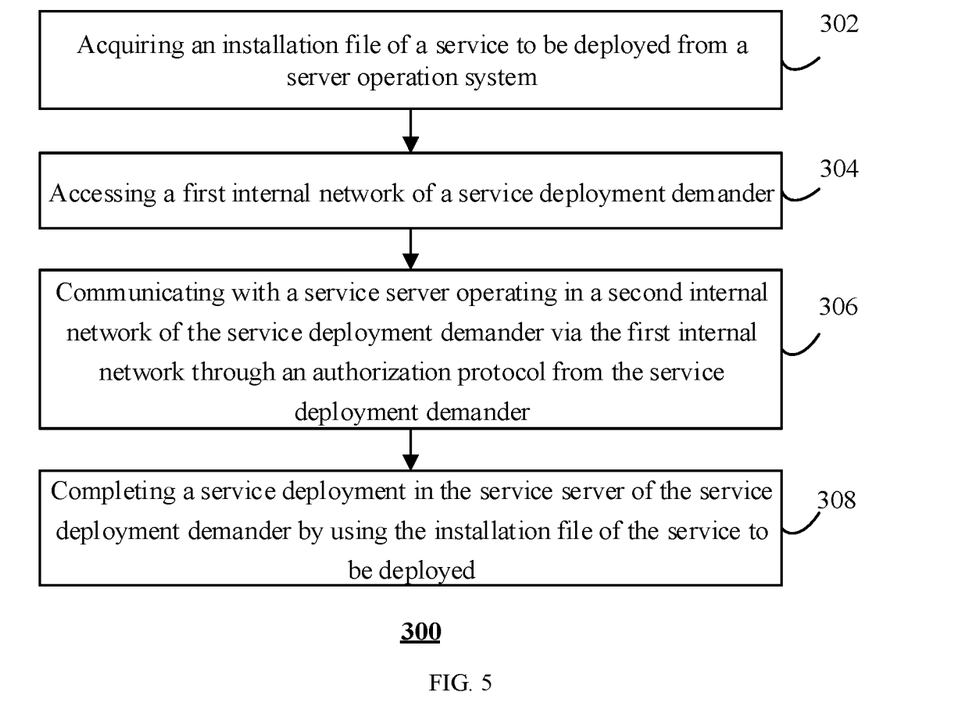
FIG. 5 illustrates a flowchart showing another exemplary process of conducting a service deployment provided by an embodiment of the present disclosure.

FIG. 5 illustrates a flowchart showing another exemplary process of conducting the service deployment method provided by an embodiment of the present disclosure. The service deployment method 300 is applied to an electronic device 106, and as shown in FIG. 5, the method includes the following steps.

In step 302, an installation file of a service to be deployed is acquired from a service operation system.

In step 302, the acquisition and code scanning of an installation file, upstream of the workflow of a privatized deployment, can be completed.

In this step, the electronic device 106 (the "ferry terminal") may provide a user interface (UI), for example, a management interface provided through the web, for completing all the configurations and operations related to the service to be deployed.

In some embodiments, the electronic device 106 accesses the DevOps system to obtain the latest stable installation package.

In some embodiments, the service deployment method 300 further includes:
scanning and testing the installation file by using the service operation system to determine the availability of the installation file.

For example, the electronic device 106 may use the sonarqube in the DevOps system to scan the code. If the scanning fails, it is determined that the workflow stops, and if scanning is passed, the workflow continues.

In step 304, a first internal network of the service deployment demander is accessed.

In this step, the electronic device 106 is moved to a designated location of the service deployment demander (the customer), such as an office location or the location of servers of the customer, etc., and then the electronic device 106 accesses a first internal network of the service deployment demanders, such as the customer's office network (a network used by ordinary employees).

Generally, the access authority set for the first internal network is low, and the electronic device 106 generally does not require special authorization to access the first internal network.

In step 306, the electronic device communicates with a service server operating in a second internal network of the service deployment demander via the first internal network through an authorization protocol from the service deployment demander, wherein the second internal network is the network where the service server, to be deployed a service, of the service deployment demander locates; the first internal network is in communication with the second internal network; and the second internal network is permitted to be accessed through the authorization protocol.

In this step, the authorization protocol from the service deployment demander can be authorized by the service deployment demander, or by the second internal network of the service deployment demander. By allowing the second internal network to be accessed through the authorization protocol, the electronic device 106 can communicate with the second internal network via the first internal network based on the authorization protocol, and then can in turn perform the service deployment on the service server.

In this step, the service server is the server to be deployed a service, and upon completion of the service deployment, the corresponding service will be run on the service server, that is the reason why the server is referred to as a service server.

In some embodiments, communicating, through the authorization protocol from the service deployment demander, with the service server operating in the second internal network of the service deployment demander via the first internal network, includes:

communicating, by a saltstack batch management tool, with the service server operating in the second internal network of the service deployment demander via the first internal network through the authorization protocol from the service deployment demander.

In some embodiments, the electronic device 106 may be developed based on the saltstack batch management tool. The saltstack is a batch management tool using a zmq protocol which is more secure and more easily accepted by the connection across local area networks than the ssh protocol. In the embodiments of the present disclosure, the zmq protocol may be accepted by a service server in a second internal network of the service deployment demander, and thus can enable communication with the service server.

In some embodiments, the servers of the service deployment demander are registered to the electronic device 106 with the saltstack, thereby completing the access to the server.

In step 308, the service deployment is completed in the service server of the service deployment demander by using the installation file of the service to be deployed.

In this step, service deployment and plug-in installation downstream of the workflow of the privatized deployment can be completed.

In some embodiments, after the electronic device 106 accesses the first internal network, the server can be registered to the electronic device 106 (that is, the electronic device 106 may be accessed by the server), and then the electronic device 106 can collect server information and use the web interface to display the collected server information. In this case, a default server architecture template or a self-defined server architecture may be selected based on the scale of the servers, and the corresponding configuration items may be checked according to requirements.

In some embodiments, after the electronic device 106 receives the installation instruction, a preset saltstack command is called via the web interface to start the service deployment in the selected server(s), and collect installation information and feedback via the web interface (for example, at least one of a graphical installation progress, installation logs, and error reminders may be provided via the web interface). In some embodiments, the saltstack distributes the files according to the configurations, and releases the image files, loads the configuration files, and initializes the database.

In some embodiments, acquiring the installation file of the service to be deployed from the service operation system, includes: acquiring an image file of the service to be deployed.

In this case, completing the service deployment in the service server of the service deployment demander by using the installation file of the service to be deployed includes: completing the service deployment in the service server of the service deployment demander by using the image file of the service to be deployed by means of a container technology (e.g., Docker).

Docker is a container engine, and the dependence on a service can be implanted to the image. When installing a service in the server, one may only need to start the container (for example, in the linux server, one may start the WeChat service of windows through the image). Therefore, the service has less dependence on the environment of the server.

In some embodiments, the service deployment method further includes:

acquiring a management file (e.g., the Docker-compose) of a container corresponding to the image file of the service to be deployed from the service operation system; and     completing a management deployment of the service in the service server of the service deployment demander by using the management file.

Docker-compose is a Docker compilation and lifecycle management tool. Using it, the start-up scheme of the container can be made clear and easier to manage. At the same time, it may be more convenient to perform the operations on the lifecycle, startup, stop, etc. of the container. Meanwhile, Docker-compose is lighter than k8s, k3s or other platforms and management solutions, thus the Docker-compose is considered for conducting the management, which is more beneficial and suitable for container deployment of small clusters.

In some embodiments, the Docker-compose provides lifecycle management for containers, including: version of image, persistent storage, port mapping, in-container variables, container restarts, container networks, and the like.

Generally, files in a container will be released after the container is closed. Persistent storage will store the files locally, and the original data can still be restored after a finished container is restarted. In some cases, the port mapping is configured to map a port in a container to a physical machine for user or program's access. Optionally, the in-container variables include an account and password to create a database, a jvm virtual machine parameters, a URL address, and the like. Docker-compose can choose the restart mode of the container to ensure that the container can be restarted after abnormal exit, so as to ensure the availability of the service. The Docker-compose can divide different networks for containers to ensure mutual access between related containers and network isolation between unrelated containers.

In some embodiments, the service deployment method further includes:

calling a service interface of the service server to test the deployed service.

For example, the service interface may be called to complete the testing under the control of the web interface.

In some embodiments, the service deployment method further includes:

in response to the customer's plug-in installation request, installing corresponding plug-in(s) in the service server, the installed plug-in(s) may include services such as, monitoring, log collection and the like.

In some embodiments, the service deployment method further includes:

determining whether it is enabled to utilize the authorization protocol to communicate with the service server operating in the second internal network via the first internal network;

performing step 306, if it is determined that it is enabled to utilize the authorization protocol to communicate with the service server operating in the second internal network via the first internal network; and     switching the deployment mode to a protocol other than said authorization protocol to communicate with the service server operating in the second internal network via the first internal network, if it is determined that it is not enabled to utilize said authorization protocol to communicate with the service server operating in the second internal network via the first internal network.

For example, the deployment mode may be switched to a deployment mode developed based on ansible automated operation tools. This deployment mode needs to use the ssh protocol to communicate with the service server working in the second internal network via the first internal network.

In some cases, some servers 104 cannot directly access the electronic device 106 through the IP address of the electronic device 106. In this case, the electronic device 106 cannot use the authorization protocol to communicate with the service server working in the second internal network via the first internal network. Instead, the electronic device 106 needs to switch to the ansible mode to deploy the server after applying for ssh permission from the customer's network security management department.

In some embodiments, the container installation method of ansible plus Docker-compose may be used. In this case, the secret key of the electronic device 106 needs to be copied to the server to realize the management of the electronic device 106 to the service server, and the service server can be deployed the service in an ansible manner.

As can be seen from the above embodiments, the present disclosure is based on the DevOps workflow, utilizing a lightweight mobile node, the "ferry terminal", to break the physical isolation between networks to complete the entire workflow of the deployment privatization. In the process of the privatization deployment, the "ferry terminal" is configured to construct the downstream part of the workflow in the physically isolated customer private network, and the "ferry terminal" is also configured to undertake the upstream workflow to complete the privatization deployment. The entire deployment process can be managed by a graphical interface.

The service deployment methods provided by the embodiments of the present disclosure do not need the developer to provide an installation package, and the "ferry terminal" will automatically acquire the latest stable version of the installation package of the business service. The service deployment methods provided by the present disclosure do not require test personnel's involvement, but the "ferry terminal" will conduct a code scanning and testing with the test system provided by the DevOps system, and upon completion of the service deployment, a service interface can be called from the "ferry terminal" to complete the testing. In the service deployment methods provided by the embodiments of the present disclosure, there is no need to copy the entire programs to the server during the deployment of the service, thereby avoiding the leaking of the technical details.

The service deployment methods provided by embodiments of the present disclosure provide a batch management based on the saltstack, and the service as deployed in the service server uses the zmq protocol to perform communication, which is more easily accepted by the security policies of the customer's internal network.

In the service deployment methods provided by the embodiments of the present disclosure, it is only needed to connect the "ferry terminal" to the customer's office network (a network that can communicate with the intranet server), and there is no need to access the server intranet to complete the service deployment. In the service deployment methods provided by the embodiments of the present disclosure, all the services are containerized by Docker, having less dependency on the service server, and is more convenient and reliable to install. In the service deployment methods provided by the embodiments of the present disclosure, by using Docker-compose to provide container compilation and lifecycle management, less resources are taken up than container management platforms such as k8s and k3s, which is more suitable for small-scale privatized installations, and is easier to manage. In the service deployment methods provided by the embodiments of the present disclosure, in a case that the customer cannot provide a valid IP address to the "ferry terminal" (this situation is relatively rare), a web page can be used to provide a switching manner to switch to the ansible method for deployment.

The embodiments of the present disclosure also provide an electronic device, including:
a communication interface (also referred to as an interface unit), configured to connect to a service operation system or a first internal network of a service deployment demander;
a memory, configured to store a set of instructions; and
at least one processor, configured to execute the set of instructions to perform any embodiment of the above-mentioned service deployment methods or the permutation or combination of those embodiments.

Figure 6:
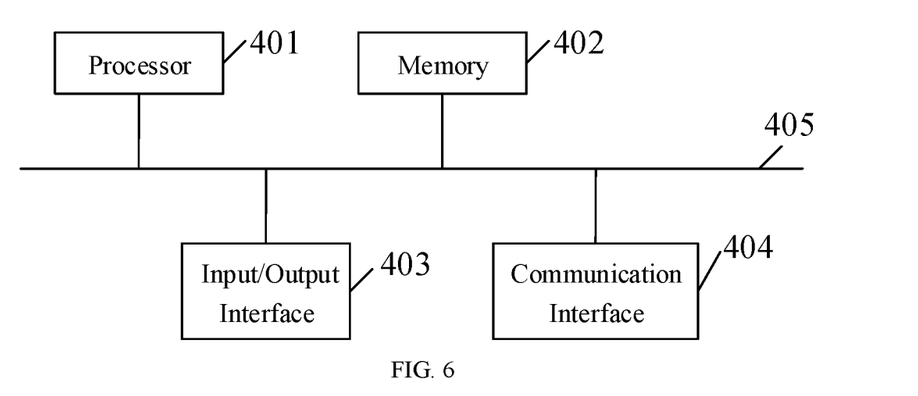
FIG. 6 illustrates a schematic structural diagram of a more specific electronic device hardware provided by an embodiment of the present disclosure.

FIG. 6 illustrates a schematic structural diagram of a more specific electronic device hardware provided by an embodiment of the present disclosure. The device may include a processor 401, a memory 402, an input/output interface 403, a communication interface 404, and a bus 405. The communication among the processor 401, memory 402, input/output interface 403, and communication interface 404 within the device are enabled via the bus 405.

The processor 401 may be implemented by a general-purpose central processing unit (CPU), a microprocessor, an Application Specific Integrated Circuit (ASIC), or one or more integrated circuits, etc. to execute related programs to implement the technical solutions provided by embodiments of the present disclosure.

The memory 402 may be implemented in the form of a ROM (Read Only Memory), a RANI (Random Access Memory), a static storage device, a dynamic storage device, and the like. The memory 402 may store an operating system and other application programs. When the technical solutions provided by the embodiments of the present disclosure are implemented by software or firmware, the related program codes are stored in the memory 402 and called and executed by the processor 401.

The input/output interface 403 is configured to connect input/output modules to enable information input and output. The input/output module may be configured as a component in the device (not shown) or may be external to the device to provide the corresponding functionality. The input devices may include a keyboard, a mouse, a touch screen, a microphone, various types of sensors, and the like, and the output devices may include a display, a speaker, a vibrator, an indicator light, or the like.

The communication interface 404 is configured to connect communication modules (not shown in the figure) to enable communication interaction between the present device and other devices. The communication module may enable communication in a wired manner (e.g., USB, network cable, etc.) or may enable communication in a wireless manner (e.g., mobile network, WIFI, Bluetooth, etc.).

Bus 405 includes a pathway to transfer information between various components of the device, such as the processor 401, the memory 402, the input/output interface 403, and the communication interface 404.

It should be noted that although the devices described above only illustrate the processor 401, the memory 402, the input/output interface 403, the communication interface 404, and the bus 405, in particular implementations, the device may also include other components necessary to implement the normal operation. Moreover, those skilled in the art will appreciate that only the components necessary to implement the embodiments of the present disclosure may be included in the aforementioned devices without necessarily including all of the components shown in the figures.

The embodiments of the present disclosure also provide a computer-readable storage medium, the computer-readable storage medium stores a computer program thereon, and when being executed by a processor, the computer program is configured to implement any method provided in the embodiments of the present disclosure.

The computer-readable storage medium provided in the embodiments includes permanent (also called non-transitory) and non-permanent (also called transitory), removable and non-removable storage media, which can be implemented by any method or technology to realize the information storage. The information may be computer readable instructions, data structures, modules of programs, or other data. Examples of storage media for a computer include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, read-only memory (CD-ROM), digital versatile disks (DVD) or other optical storage, magnetic cassettes, magnetic tape type magnetic disk storage, other magnetic storage devices, or any other non-transmission medium that can be configured to store information which can be accessed by a computer.

The foregoing describes specific embodiments of the present disclosure. Other implementations are also within the scope of the following claims. In some cases, the actions or steps recited in the claims can be performed in an order different than that in the embodiments and still achieve desirable results. In addition, the processes depicted in the accompanying figures do not necessarily require the particular order shown, or sequential order shown in order to achieve the desired results. In some embodiments, multitasking and parallel processing are also possible or may be advantageous.

Those of ordinary skill in the art should understand: the discussion of any of the above embodiments is only exemplary, and is not intended to imply that the scope of the present disclosure (including the claims) is limited to these examples; under the idea of the present disclosure, the above embodiments or the technical features in different embodiments can also be combined, the steps can be implemented in any order, and there may be many other changes in different aspects of the present disclosure as described above, and they are not provided in the details for the sake of brevity.

While the present disclosure has been described in connection with specific embodiments thereof, many alternatives, modifications, and variations of these embodiments will be apparent to those of ordinary skill in the art in light of the foregoing description. For example, other memory architectures (e.g., dynamic RANI (DRAM)) may be used for the embodiments discussed.

The disclosure is intended to embrace all such alterations, modifications and variations that fall within the broad scope of the appended claims. Accordingly, any omissions, modifications, equivalents, improvements, and the like, which may be made within the spirit and principles of the present disclosure, shall be embraced within their scope.

What is claimed is:

1. A service deployment method, comprising:
   acquiring an installation file of a service to be deployed from a service operation system;
   accessing a first internal network of a service deployment demander;
   communicating, based on a saltstack batch management tool, with a service server operating in a second internal network of the service deployment demander via the first internal network through an authorization protocol from the service deployment demander, wherein the first internal network is in communication with the second internal network, and the second internal network allows to be accessed through the authorization protocol;
   completing a service deployment in the service server by using the installation file; and
   in response to determining that it is not enabled to utilize the authorization protocol from the service deployment demander to communicate with the service server via the first internal network, switching a deployment mode developed based on ansible automated operation tools to use a Secure Shell (SSH) protocol to communicate with the service server via the first internal network.

2. The method according to claim 1, wherein the authorization protocol is a zmq protocol, wherein the zmq protocol is a protocol in an intra-process communication.

3. The method according to claim 1, wherein the acquiring an installation file of a service to be deployed from a service operation system comprises: acquiring an image file of the service to be deployed, and
   wherein the completing a service deployment in the service server by using the installation file comprises: completing the service deployment in the service server by using the image file by means of a container technology.

4. The method according to claim 3, further comprising:
   acquiring a management file of a container corresponding to the image file from the service operation system; and
   completing a management deployment of the service in the service server by using the management file.

5. The method according to claim 1, further comprising:
   performing a code scan detection on the installation file by using the service operation system to determine an availability of the installation file.

6. The method according to claim 1, further comprising:
   calling a service interface of the service server to test the deployed service.

7. The method according to claim 3, wherein the completing the service deployment in the service server by using the image file by means of the container technology comprises: completing the service deployment in the service server by using the image file by means of a container installation mode of ansible plus Docker-compose in an ansible manner.

8. An electronic device, comprising:
   a communication interface, configured to connect to a service operation system or a first internal network of a service deployment demander;
   a memory, configured to store a set of instructions; and
   at least one processor, configured to execute the set of instructions to implement:

acquiring an installation file of a service to be deployed from a service operation system;

accessing a first internal network of a service deployment demander;

communicating, based on a saltstack batch management tool, with a service server operating in a second internal network of the service deployment demander via the first internal network through an authorization protocol from the service deployment demander, wherein the first internal network is in communication with the second internal network, and the second internal network allows to be accessed through the authorization protocol;

completing a service deployment in the service server by using the installation file; and in response to determining that it is not enabled to utilize the authorization protocol from the service deployment demander to communicate with the service server via the first internal network, switching a deployment mode developed based on ansible automated operation tools to use a Secure Shell (SSH) protocol to communicate with the service server via the first internal network.

9. The electronic device according to claim 8, wherein the authorization protocol is a zmq protocol, wherein the zmq protocol is a protocol in an intra-process communication.

10. The electronic device according to claim 8, wherein the acquiring an installation file of a service to be deployed from a service operation system comprises: acquiring an image file of the service to be deployed, and wherein the completing a service deployment in the service server by using the installation file comprises: completing the service deployment in the service server by using the image file by means of a container technology.

11. The electronic device according to claim 10, wherein the at least one processor is configured to execute the set of instructions to further implement:

acquiring a management file of a container corresponding to the image file from the service operation system; and completing a management deployment of the service in the service server by using the management file.

12. The electronic device according to claim 8, wherein the at least one processor is configured to execute the set of instructions to further implement:

performing a code scan detection on the installation file by using the service operation system to determine an availability of the installation file.

13. The electronic device according to claim 8, wherein the at least one processor is configured to execute the set of instructions to further implement:

calling a service interface of the service server to test the deployed service.

14. The electronic device according to claim 10, wherein the completing the service deployment in the service server by using the image file by means of the container technology comprises: completing the service deployment in the service server by using the image file by means of a container installation mode of ansible plus Docker-compose in an ansible manner.

15. A service deployment system, comprising:

an electronic device and a service operation system, wherein the service operation system is configured to: establish a connection with the electronic device and send an installation file of a service to be deployed to the electronic device; and wherein the electronic device is configured to:

acquire the installation file of the service to be deployed from the service operation system;

access a first internal network of a service deployment demander;

communicate, based on a saltstack batch management tool, with a service server operating in a second internal network of the service deployment demander via the first internal network through an authorization protocol from the service deployment demander, wherein the first internal network is in communication with the second internal network, and the second internal network allows to be accessed through the authorization protocol;

complete a service deployment in the service server by using the installation file; and in response to determining that it is not enabled to utilize the authorization protocol from the service deployment demander to communicate with the service server via the first internal network, switching a deployment mode developed based on ansible automated operation tools to use a Secure Shell (SSH) protocol to communicate with the service server via the first internal network.

16. The service deployment system according to claim 15, wherein the authorization protocol is a zmq protocol, wherein the zmq protocol is a protocol in an intra-process communication.

17. A non-transitory computer-readable storage medium storing computer instructions thereon for causing a processor of a computer to perform the method according to claim 1.

* * * * *